United States Patent [19]

Tanabe

[11] 4,385,877
[45] May 31, 1983

[54] INJECTION MOLDING APPARATUS

[76] Inventor: Norihiko Tanabe, No. 21-18, Yako 3-Chome, Tsurumi-Ku, Yokohama City, Kanagawa Pref., Japan

[21] Appl. No.: 331,561

[22] Filed: Dec. 17, 1981

[30] Foreign Application Priority Data

Dec. 23, 1980 [JP] Japan .............................. 55/183061

[51] Int. Cl.³ .............................................. B29F 1/06
[52] U.S. Cl. ...................................... 425/3; 425/589; 425/DIG. 33
[58] Field of Search ............ 425/3, 174.8 R, DIG. 33; 264/24, 108, DIG. 58

[56] References Cited

U.S. PATENT DOCUMENTS 3,530,551  9/1970  Haes ........................................ 425/3

Primary Examiner—Thomas P. Pavelko
Attorney, Agent, or Firm—James E. Nilles

[57] ABSTRACT

An injection molding apparatus wherein an annular magnetic coil is disposed to enclose the outer periphery of a mold when it is clamped and to move in the directions to open and close said mold. An injection molding apparatus comprising, a stationary mold, a moving mold made movable to and from said stationary mold for forming an injection molding cavity together with said stationary mold, a magnetic coil movable back and forth in cooperation with the operation of said movable mold and adapted to enclose the outer peripheries of the two molds clamped.

11 Claims, 3 Drawing Figures

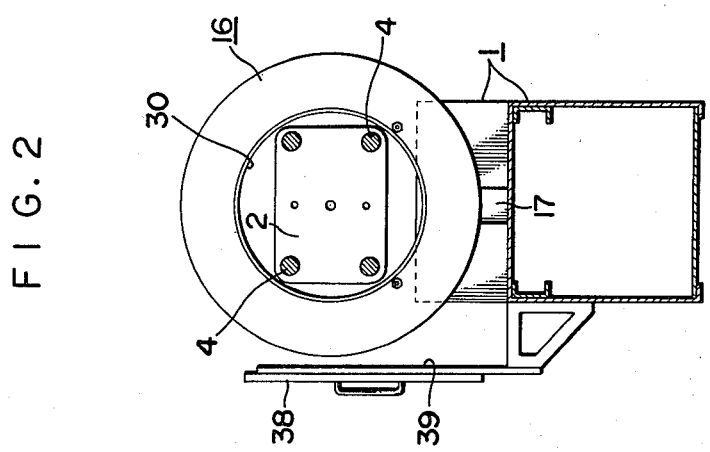
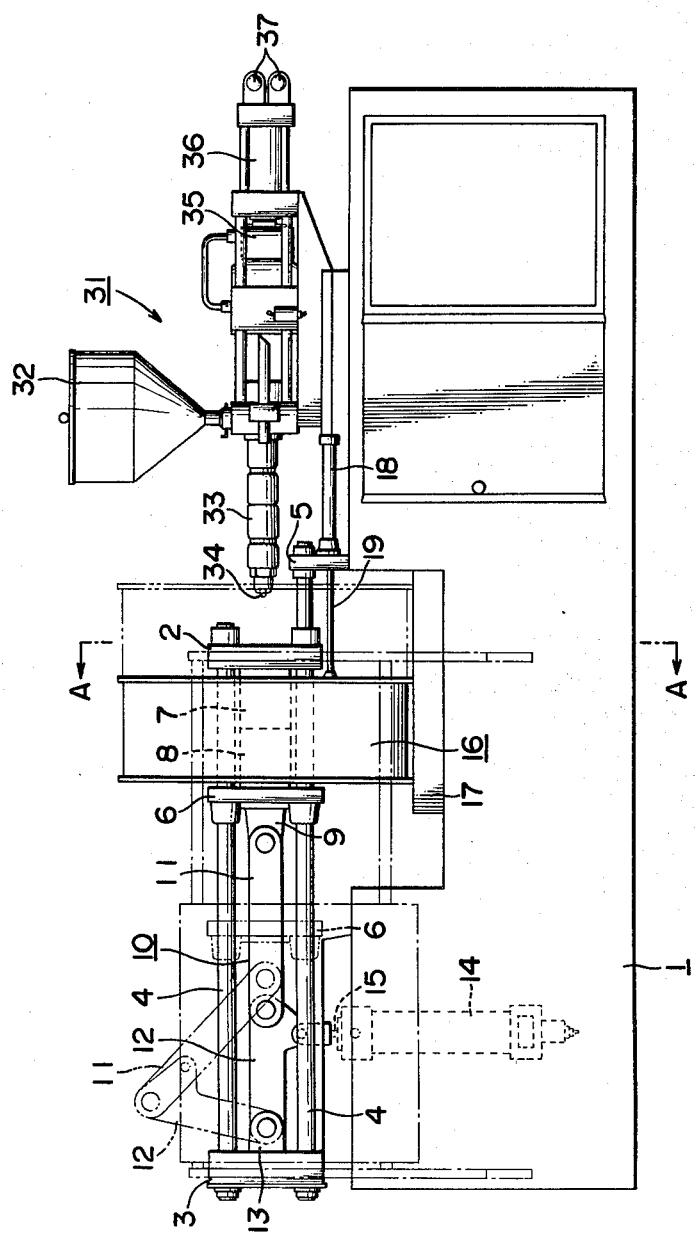

INJECTION MOLDING APPARATUS

BACKGROUND OF THE INVENTION

1. Field of the Invention:

The present invention relates to an injection molding apparatus and, more particularly, to an injection molding apparatus which is equipped with a magnetic coil for anisotropically magnetizing a plastic magnet.

2. Description of the Prior Art:

According to the prior art, a plastic magnet has resorted to injection molding means, for example, for injecting a synthetic resin material, which is admixed with powders of a magnetic material (such as barium ferrite, strontium carbonate ferrite or a rare earth element, e.g., cobalt), into the cavity of a mold and for anisotropically magnetizing the synthetic resin material injected with the use of a magnetic coil which is either fixedly disposed outside of or mounted in the aforementioned mold. In this case, such a large-sized magnetic coil as can generate a strong magnetic field (e.g., at 12,000 Oe) in the cavity of the mold is required for making the moldings sufficiently anisotropic. According to the means of that kind, i.e., the injection molding means having the large-sized magnetic coil fixedly disposed, however, that magnetic coil causes obstruction, either when the mold is to be opened so as to take out the moldings or when the mold is to be attached or detached and confirmed, thereby to raise a working problem. According to the injection molding means having the magnetic coil mounted in the mold, on the other hand, it is difficult to incorporate the coil having such a large size as is sufficient for anisotropy.

SUMMARY OF THE INVENTION

It is, therefore, an object of the present invention to provide an injection molding apparatus which can exert a magnetic field upon the moldings blended with a magnetic material to make them sufficiently anisotropic and can extract them without any difficulty.

Another object of the present invention is to provide an injection molding apparatus which can control the moving position of a magnetic coil so suitably as to facilitate the attachment or detachment of a mold and the confirmation of the mold such as its maintenance or inspection.

BRIEF DESCRIPTION OF THE DRAWINGS

Other objects and features of the present invention will be made apparent by the following description with reference to the accompanying drawings:

FIG. 1 is a front elevation showing an injection molding apparatus according to the present invention;

FIG. 2 is a section taken along line A—A of FIG. 1; and

DESCRIPTION OF THE PREFERRED EMBODIMENTS

Figure 3:
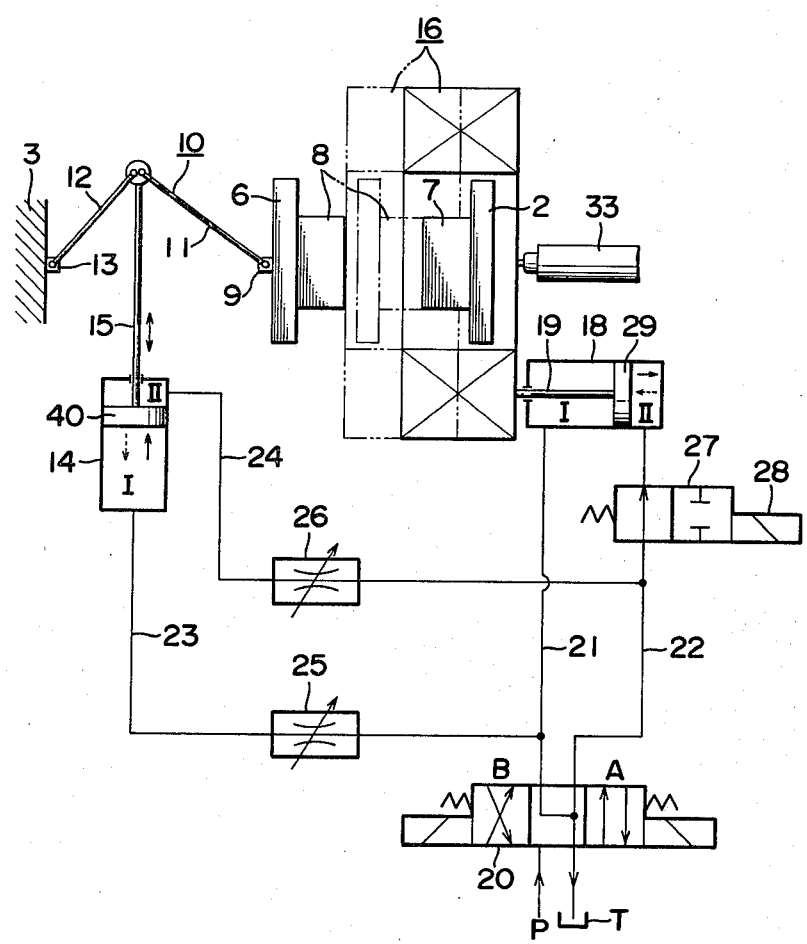
FIG. 3 is an explanatory diagram for explaining the operations of the injection molding apparatus shown in FIGS. 1 and 2.

Generally indicated at reference numeral 1 is a platform, above which there are disposed a stationary mold plate 2 and a tail stock 3 in a manner to face each other at a spacing. Between those stationary mold plate 2 and the tail stock 3, there are sandwiched four mold bars 4 which are made of such a non-magnetic material as can prevent a magnetic flux from being lost. Of them, the lower pair of the mold bars 4, which are disposed at lower positions to face each other, have their extending inner end portions fixed to a supporting frame 5 which protrudes upright from the aforementioned platform 1.

On the aforementioned respective mold bars 4, moreover, there are slidably mounted a moving mold plate 6 having an inner side, on which a moving mold 8 is mounted such that it can be carried to and from a stationary mold 7 fixed to the aforementioned stationary mold plate 2. A retaining member 9 is formed to protrude from the outer side of the moving mold plate 6 carrying that moving mold 8. To the retaining member 9, there is hingedly connected one end portion of one cooperative lever 11 of a toggle link 10, which has its other cooperative lever 12 hingedly connected at its one end portion to the retaining member 13 of the aforementioned tail stock 3. To an intermediate portion of that toggle link 10, there is also hingedly connected a leading end portion of the piston rod 15 of a mold clamping cylinder 14. By the extension and contraction of the piston rod 15 of that mold clamping cylinder 14, therefore, the aforementioned moving mold 8 is moved to and from the stationary mold 7 through the toggle link 10.

Generally indicated at numeral 16, on the other hand, is a magnetic coil for generating a magnetic field, which is disposed to enclose the outer peripheries of both the aforementioned stationary and moving molds 7 and 8 when these molds 7 and 8 are to be clamped. That magnetic coil 16 is formed into an annular shape and is equipped on its inner circumference with an insulating device 30 which is constructed of a cooling water jacket or an insulator for effecting thermal insulation from both the aforementioned molds 7 and 8. Moreover, that magnetic coil 16 is arranged to move back and forth on a guide rail 17 which is placed on the aforementioned platform 1. At the same time, there is attached to the lower end of one side of that magnetic coil 16 a leading end portion of the piston rod 19 of a coil moving cylinder 18 which is fixedly placed on the aforementioned platform 1. With both the ends of the aforementioned coil moving cylinder 18, there are connected by way of an electromagnetic valve 20 two fluid passages 21 and 22 which are to be switched between the supply and return sides. A pump P is connected with the one fluid passage 21 whereas a tank T is connected with the other fluid passage 22. Moreover, throttle valves 25 and 26 are disposed midway of branch passages 23 and 24 which are branched from those fluid passages 21 and 22, respectively, and which have their other ends connected with both the ends of the aforementioned mold clamping cylinder 14. Midway of the aforementioned other fluid passage 22, still moreover, there is disposed an electromagnetic valve 27 acting as control means, which is to be opened and closed by turning on and off such a switch (although not shown) as is made operative to operate a solenoid 28 attached to that electromagnetic valve 27, thereby to control the operations of the piston 29 of the aforementioned cylinder 18, i.e., to actuate or stop that piston 29.

Generally indicated at numeral 31, on the other hand, is an injection unit which is placed on the aforementioned platform 1. This injection unit 31 is constructed of a hopper 32, a heating cylinder 33, an injection nozzle 34, a screw rotating oil motor 35, an injection cylinder 36 and a hydraulic valve 37. Incidentally, numerals 38 and 39 indicate a safety door and a door guide, respectively.

Next, the operations of the injection molding apparatus having the construction thus far described will be described in the following.

With reference to FIG. 3, when the molds 7 and 8 are to be opened, the communication between the fluid passages 21 and 22 is established at a position A of the electromagnetic valve 20 so that the fluid pumped out of the pump P flows into a chamber I, which is partitioned by the piston 29 of the coil moving cylinder 18, to force that piston 29 in the direction of solid arrow indicated in a chamber II thereby to retract the magnetic coil 16, which is connected to the piston rod 19 of that piston 29, from the closing position of both the molds 7 and 8.

On the other hand, the fluid pumped out of the pump P simultaneously flows into a chamber I of the mold clamping cylinder 14 by way of the branch passage 23, which is branched from the fluid passage 21, so that it forces a piston 40 in the direction of solid line indicated in a chamber II thereby to retract the moving mold 8, which is carried on the moving mold plate 16, from the stationary mold 7 through the toggle link 10 which is connected to the piston rod 15 of that piston 10.

As a result, the mold opening operation by the moving mold 8 is performed simultaneously with the retraction of the magnetic coil 16. In this case, the fluid in the chambers II of the aforementioned coil moving cylinder 18 and mold clamping cylinder 14 is returned into the tank T by way of the other fluid passage 22 by the forced movements of the respective pistons 29 and 40.

When the molds 7 and 8 are to be closed, on the contrary with reference to FIG. 3, the communication between the fluid passages 21 and 22 is established at a position B of the electromagnetic valve 20 so that the fluid pumped out of the pump P flows into the chamber II of the coil moving cylinder 18 to move the piston 29 in the direction of broken arrow indicated in the chamber I thereby to advance the magnetic coil, which is connected to the piston rod 19 of that piston 29, to the mold closing position of both the molds 7 and 8.

On the other hand, the fluid pumped out of the pump P simultaneously flows into the chamber II of the mold clamping cylinder 14 by way of the branch passage 24, which is branched from the fluid passage 22, so that it forces the piston 40 in the direction of broken arrow indicated in the chamber I thereby to advance the moving mold 8, which is carried on the moving mold plate 6, to the stationary mold 7 through the toggle link 10 which is connected to the piston rod 15 of that piston 40.

As the result, the mold closing operation by the moving mold 8 is performed simultaneously with the advance of the magnetic coil 16, and both those molds 7 and 8 have their outer peripheries enclosed by the magnetic coil 16 simultaneously with the mold clamping operation of the two molds 7 and 8. In this case, the fluid in the chambers I of the aforementioned coil moving cylinder 18 and mold clamping cylinder 14 is returned into the tank T by the forced movements of the respective pistons 29 and 40.

Next, in the aforementioned case, if the switch to operate the solenoid 28 of the electromagnetic valve 27 disposed midway of the other fluid passage 22 is turned on in advance or at an arbitrary time, the fluid passage 22 is shut off to interrupt of the forced supply of the fluid into the chamber II of the coil moving cylinder 18 thereby to stop the movement of the magnetic coil 16 while allowing only the forced supply of the fluid into the chamber II of the mold clamping cylinder 14 so that only the moving mold 8 can be advanced to the stationary mold 7, while stopping the movement of the magnetic coil 16 in advance or at an arbitrary position, thereby to effect the mold clamping operation.

If the switch to operate the solenoid 28 of the electromagnetic valve 27 is turned off at an arbitrary time, on the contrary, the moving mold 8 can be advanced and retracted, under the condition having the magnetic coil 16 stopped at an arbitrary position of the outer peripheries of both the molds 7 and 8 independently of the mold clamping and releasing operations, thereby to open and close the molds 7 and 8.

Next, the heating cylinder 33 of the injection unit 31 in advanced, and a synthetic resin material, which is blended with the powders of a magnetic material such as barium ferrite, strontium carbonate ferrite or a rare earth element, e.g., cobalt, is injected from the injection nozzle 34 of that heating cylinder 33 into the cavity which is defined by both the molds 7 and 8 clamped. In this case, since the outer peripheries of both the molds 7 and 8 are enclosed by the magnetic coil 16, the powders of the magnetic material in the cavity can be arranged by the magnetic field, which is generated by that magnetic coil 16, in the direction of that magnetic field so that it can be made anisotropic. Because of the use of the system having no magnetic coil built in the mold, on the other hand, a heat resisting property is recently required of the moldings thereby to make it necessary to raise the molding temperature to about 130° C. in accordance with the rise in the melting point of the molding material. In the case of the conventional magnetic coil built in the mold, it has been difficult to supply the coil with a sufficiently high and stable current because it is heated at the mold temperature. With these in mind, nevertheless, the magnetic coil 16 can be cooled, while the molds 7 and 8 are being heated, by equipping the magnetic coil 16 with the insulating device 30 according to the system of the present invention, thereby to ensure a power supply sufficient for the anisotropy. Incidentally, although the embodiment thus far described is directed to the case in which the electromagnetic valve 27 is used as the control means for controlling the magnetic coil 16, the present invention should not be limited thereto but can be so modified as to use control means such as a manual valve or a throttle valve.

According to the present invention, since the magnetic field generating coil enclosing the outer peripheries of the molds for the injection molding process is enabled to move in the mold opening and closing directions, the moldings blended with the powders of the magnetic material can be influenced, when in the clamping operation of the molds, by the magnetic field so that they can be made sufficiently anisotropic as a result that the molds have their peripheries enclosed by the magnetic coil. When in the mold releasing operations, moreover, the magnetic coil is moved to a position, in which it causes no obstruction to the extraction of the moldings, to facilitate the extraction of the moldings and the inspection and confirmation of the residual in the molds.

According to the present invention, furthermore, the moldings can be extracted with ease in accordance with the releasing operations of the molds by moving back and forth the magnetic coil enclosing the outer peripheries of the molds in cooperation with the operation of the moving mold which is enabled to move to and from the stationary mold. At the same time, the attachment or detachment of the molds and the confirmation such as the maintenance or inspection of the molds can be performed with ease by controlling that magnetic coil, if necessary, such that it is immovable. Thus, there arises no disadvantage that the magnetic coil causes obstruction to various works, thus making it possible to provide an injection molding apparatus which is excellent in workability and moldability.

Furthermore, a continuous molding process can be effected highly efficiently by operating the magnetic coil simultaneously with the operation of the moving mold. Furthermore, the working conditions can be promptly and easily coped with by controlling the movement of the magnetic coil by means of the electromagnetic valve, the manual valve and the throttle valve.

What is claimed is:

1. An injection molding apparatus comprising: a mold for an injection molding process; means to enable opening and closing of said mold; an annular magnetic coil for generating a magnetic field and disposed to enclose the outer periphery of said mold; and means to move said magnetic coil in directions related to the open and closed positions of said mold, characterized in that said mold has its outer periphery enclosed by said magnetic coil when said mold is closed and is clear of said magnetic coil when said mold is open.

2. An injection molding apparatus according to claim 1 wherein said means to enable opening and closing of said mold includes a mold bar which is disposed between said magnetic coil and said mold when said mold is closed, and wherein said mold bar is fabricated of non-magnetic material.

3. An injection molding apparatus comprising: a stationary mold; a movable mold movable toward said stationary mold to closed position and for forming an injection molding cavity together with said stationary mold and movable away from said stationary mold to open position; a magnetic coil for generating a magnetic field reciprocably movable in cooperation with the operation of said movable mold and adapted to enclose the outer peripheries of the two molds when the movable mold is in closed position; and control means for controlling the movement of said magnetic coil.

4. An injection molding apparatus as set forth in claim 3, wherein said magnetic coil is reciprocably movable simultaneously with said movable mold.

5. An injection molding apparatus as set forth in claim 3 or 4, wherein said control means for controlling the movement of said magnetic coil includes a selectively operable valve.

6. An injection molding apparatus according to claim 1 or 3 further including thermal insulating means disposed between said magnetic coil and said mold when said mold is closed.

7. An injection molding apparatus according to claim 4 including a mold bar on which said movable mold is movably mounted, which mold bar is disposed between said magnetic coil and at least one mold when said movable mold is in closed position, said mold bar being fabricated of non-magnetic material.

8. An injection molding apparatus comprising: a stationary mold, a movable mold movable toward and away from said stationary mold for forming an injection molding cavity together with said stationary mold when moved toward said stationary mold, a mold clamping cylinder for moving said moving mold toward and away from said stationary mold in the directions of mold opening and closing, a magnetic coil for generating a magnetic field adapted to enclose the outer peripheries of the two molds when they are clamped and made movable in the moving direction of said moving mold independently of said two molds for orientating anisotropically in the direction of magnetic field a magnetic material injected into said cavity, a coil moving cylinder for reciprocably moving said magnetic coil with reference to the movement of said movable mold toward said stationary mold, and an injection nozzle for injecting a synthetic resin material blended with a magnetic material into said cavity.

9. An injection molding apparatus as set forth in claim 8, wherein said magnetic coil for generating a magnetic field is formed into an annular shape and includes an insulating device for effecting thermal insulation from both of said molds.

10. An injection molding apparatus comprising: a stationary mold, a movable mold movable toward and away from said stationary mold for forming an injection molding cavity together with said stationary mold when moved toward said stationary mold, a mold clamping cylinder for moving said moving mold relative to said stationary mold in the directions of mold opening and closing, a magnetic coil for generating a magnetic field adapted to enclose the outer peripheries of the two molds when they are clamped and made movable in the moving direction of said moving mold independently of said two molds for orientating anisotropically in the direction of magnetic field a magnetic material injected into said cavity, an insulating device provided on said magnetic coil for effecting thermal insulation from both of said molds so as to prevent said magnetic coil from being heated, a coil moving cylinder for reciprocably moving said magnetic coil with reference to the movement of said movable mold toward said stationary mold, an injection nozzle for injecting a synthetic resin material blended with a magnetic material into said cavity, an electromagnetic means for reciprocably moving said coil moving cylinder and said mold clamping cylinder simultaneously with each other, and control means provided for said coil moving cylinder for controlling the moving position of said magnetic coil independently of the movement of said moving mold so as to set said magnetic coil at a desired position.

11. An injection molding apparatus as set forth in claim 10, wherein said control means for controlling the movement of said magnetic coil includes a selectively operable valve and a throttle valve.

* * * * *